United States Patent Office 3,732,344
Patented May 8, 1973

3,732,344
PREPARATION OF PHOSPHOROAMIDOTHIONATE BY ANHYDRIDE ACYLATION
James L. Platt, Jr., San Rafael, Calif., assignor to Chevron Research Company, San Francisco, Calif.
No Drawing. Filed July 21, 1971, Ser. No. 164,895
Int. Cl. C07f 9/02, 9/24
U.S. Cl. 260—984        7 Claims

ABSTRACT OF THE DISCLOSURE

N-acyl derivatives of O,O-dialkyl phosphoroamidothionate are prepared by reacting O,O-dialkyl phosphoroamidothionate with an anhydride in the presence of a catalytic amount of a strong acid at a temperature of from 20–90° C.

BACKGROUND OF THE INVENTION

Field

The present invention is concerned with the preparation of N-acyl derivatives of O,O-dialkyl phosphoroamidothionate using an anhydride as an acylating agent. The N-acyl derivatives are useful intermediates in the preparation of highly effective insecticides.

Prior art

Recent literature suggests several routes for the preparation of compounds of the general type

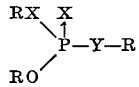

wherein X is oxygen or sulfur and Y is oxygen, sulfur or —NH and R is aryl or an alkyl group. These routes generally require basic conditions. Thus, G. B. Quistad et al., Insecticidal, Anticholinesterase, and Hydrolytic Properties of Phosphoroamidothiolates, J. Agr. Food Chem., 18, No. 2, page 189 (1970) discloses phosphoroamidothiolate ester preparation using ammonia or a desired amine (basic conditions) and an appropriate O,O-dialkyl phosphorochloridothioate. U.S.S.R. Pat. 245,095, issued June 4, 1969, Chem. Abstracts, 72, 273 (1970) discloses N-acylamidophosphoric acid ester preparation by treating phosphoric acid with carboxylic acid chlorides in the presence of an organic base.

SUMMARY OF THE INVENTION

It has now been found that acylation of certain organo phosphorus compounds, i.e. phosphoroamidothionates, with certain anhydrides is very effective when performed in the presence of catalytic amounts of strong acids and at temperatures of 20–90° C.

DESCRIPTION OF THE INVENTION

The anhydride acylation reaction of the present invention can be represented by the following equation:

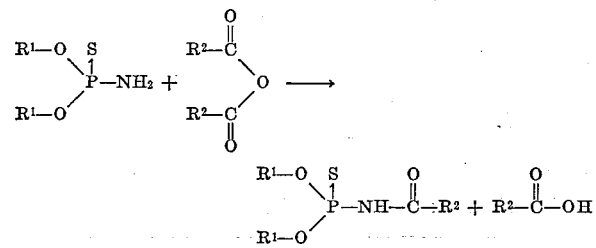

wherein $R^1$ is alkyl of 1 to 3 carbon atoms, preferably methyl, and $R^2$ is an aliphatic group of 1 to 18 carbon atoms substituted with 0 to 4 halogen atoms of atomic number 9 to 35 (fluorine, chlorine or bromine) or aryl of 6 to 12 carbon atoms substituted with 0 to 2 halogen atoms of atomic number 9 to 35 or alkyl groups individually of 1 to 4 carbon atoms. Preferably $R^2$ is alkyl of 1 to 8 carbon atoms, more preferably alkyl of 1 to 4 carbon atoms, most preferably alkyl of 1 to 2 carbon atoms. It is within the scope of the present invention for one of the $R^2$'s of the anhydride to be an aliphatic group and the other hydrogen. By using an unsymmetrical anhydride the formyl derivative of O,O-dialkyl phosphoroamidothionate can be produced. The anhydride acylation reaction of the present invention is particularly beneficial in the conversion of O,O-dialkyl phosphoroamidothionate with acetic anhydride to produce O,O-dimethyl-N-acetyl phosphoroamidothionate.

Representative aliphatic groups which $R^2$ can represent include alkyl of 1 to 18 carbon atoms, alkenyl of 2 to 18 carbon atoms and alkynyl of 2 to 18 carbon atoms. Thus $R^2$ can be methyl, ethyl, propyl, butyl, vinyl, allyl, propargyl, chloromethyl, bromomethyl, etc. Representative groups which $R^2$ can represent include phenyl, o-chlorophenyl, tolyl, benzoyl, o-ethylphenyl, p-butylphenyl, etc.

Examples of suitable phosphoroamidothionate reactants of the present process include O,O-dimethyl phosphoroamidothionate, O,O-diethyl phosphoroamidothionate, O,O-dipropyl phosphoroamidothionate, O-methyl-O-ethyl phosphoroamidothionate, O-methyl-O-propyl phosphoroamidothionate, etc.

The anhydride acylation reaction is normally carried out by dissolving O,O-dialkyl phosphoroamidothionate in an inert solvent and then adding the anhydride at ambient temperature. After thorough mixing, the appropriate acid can be added to the reaction mixture. Of course, other procedures may be followed such as mixing O,O-dialkyl phosphoroamidothionate and acid together and then adding the anhydride and solvent. It is not considered critical which sequence is used in mixing the components.

At least equimolar amounts of anhydride should be added to the O,O-dialkyl phosphoroamidothionate. Preferably, however, excess anhydride is used, for example up to double or more the molar amount of the O,O-dialkyl phosphoroamidothionate. Suitable anhydrides include acetic anhydride, propionic anhydride, chloroacetic anhydride, n-butyric anhydride, benzoic anhydride and acetic formic anhydride.

The reaction may be conducted in the presence of an inert solvent or neat. When conducted neat, the anhydride acts as a suitable solvent; in this case, a large excess of the anhydride may be desirable. Suitable inert solvents which may be used include: methylene dichloride, 1,2-dichloroethane, benzene, toluene, o-xylene, chloroform, carbon tetrachloride and high boiling esters or other solvents which do not enter into the reaction in any way. The amount of inert solvent will generally vary from 0.05 to 100 moles of solvent per mole of O,O-dialkyl phosphoroamidothionate, preferably from 0.1 to 50 moles of solvent per mole of phosphoroamidothionate. Generally enough solvent should be present to dissolve the O,O-dialkyl phosphoroamidothionate.

The acid acts as a catalyst in the reaction of the anhydride with the phosphoroamidothionate. The amount of the acid in the reaction mixture should therefore be of catalytic amount and can vary from 0.001 to 10 moles per mole of O,O-dialkyl phosphoroamidothionate, more preferably from 0.001 to 2 moles. The acid should be a strong acid, i.e. have a $pK_a$, as measured in an aqueous solution, of less than about 4.75 and preferably less than about 4.5. Also, it is preferred that the acid be substantially soluble in the reaction mixture. Thus suitable acids for purposes of the present process include phosphoric acid (pK$_a$ of 2.2), sulfuric acid, methanesulfonic acid, nitric acid, hydrochloric acid, perchloric acid, etc. Amberlyst 15 resin which is a strongly acidic resin is also an effective catalyst for the anhydride reaction. On the other hand, acetic acid (pK$_a$ of 4.76) and basic materials such as collidine do not catalyze the reaction of the anhydride with the phosphoroamidothionate. Methyl phosphoric acid and dimethyl phosphoric acid also do not catalyze the reaction, these acids being relatively insoluble in the reaction mixture.

The temperature at which the reaction is conducted will be from 30 to 90° C., preferably from 20 to 50° C. The pressure may be atmospheric, subatmospheric or superatmospheric. However, for convenience of conducting the reaction, the pressure will be atmospheric. The time of reaction will, of course, vary depending upon the reactants, upon the concentration of the acid and upon the temperature. Generally the reaction time will be from 0.25 to 24 hours, more preferably 0.5 to 5 hours.

The reaction product, i.e. the N-acyl derivative of O,O-dialkyl phosphoroamidothionate may be purified by conventional extraction and crystallization procedures. Thus, for example, the reaction solution may be neutralized by the addition of ammonium hydroxide and the organic phase separated, washed, dried over magnesium sulfate and stripped to yield the desired N-acyl derivative.

Examples of N-acyl derivative products of the present process include

O,O-dimethyl-N-acetyl phosphoroamidothionate,
O,O-diethyl-N-acetyl phosphoroamidothionate,
O,O-dipropyl-N-acetyl phosphoroamidothionate,
O,O-dimethyl-N-propionyl phosphoroamidothionate,
O,O-dimethyl-N-butyryl phosphoroamidothionate,
O,O-dimethyl-N-chloroacetyl phosphoroamidothionate,
O,O-dimethyl-N-pentanoyl phosphoroamidothionate,
O,O-dimethyl-N-hexanoyl phosphoroamidothionate,
O,O-diethyl-N-propionyl phosphoroamidothionate,
O,O-dimethyl-N-formyl phosphoroamidothionate, and
O,O-dimethyl-N-benzoyl phosphoroamidothionate.

The N-acyl derivatives prepared by the present invention are useful intermediates in the preparation of highly effective pesticides. The N-acyl derivatives prepared by the above-described process may be reacted with an acylating agent to produce O-alkyl-S-aliphatic hydrocarbyl-N-acyl phosphoroamidothioate. This reaction scheme may be represented by the following equation:

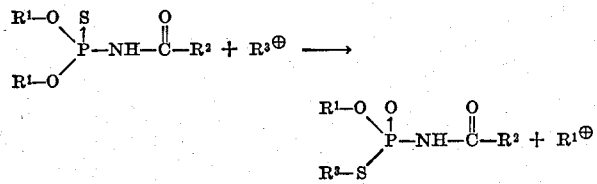

wherein R$^1$ and R$^2$ are as described above and R$^3$ is an aliphatic hydrocarbyl group of 1 to 3 carbon atoms and will be alkyl, alkenyl or alkynyl, such as methyl, ethyl, propyl, allyl and propargyl. If R$^3$ is an unsaturated radical it will normally have a single terminal olefinic or acetylenic site of unsaturation. The propyl group represented by R$^3$ may be normal or iso. Preferably R$^2$ is methyl. The preferred alkylating agents are the dimethyl esters of sulfuric acid, i.e., dimethyl sulfate, or the methyl esters of organic sulfonic acid (i.e., methyl sulfonates), as described in U.S. application Ser. No. 792,785, filed Jan. 21, 1969. Other alkylating agents, however, such as methyl iodide, may be used. The alkylating reaction can be accomplished at a temperature of from 20 to 100° C. Generally the amount of alkylating agent may vary up to a molar amount. However, normally 1 to 10 mole percent based on the total reaction mixture is sufficient.

The O-alkyl-S-aliphatic hydrocarbyl-N-acyl phosphoroamidothioates find use as insecticides in the control of, e.g., roaches, houseflies, cabbage loopers, aphids, bollworms, armyworms or corn earworms.

The method of the present invention may be more fully understood by reference to the following examples.

EXAMPLE 1

600 g. of a solution containing 47% by weight of O,O-dimethyl phosphoroamidothionate (2 moles) in methylene dichloride (3.7 moles) and 1% water were treated with acetic acid until any alkaline species present were neutralized. Approximately 20 g. of acetic acid were added. At ambient temperature, 306 g. (3 moles) of acetic anhydride were added in one portion. No exotherm was detected and a clear solution resulted. In a single portion, 10 g. of commercial phosphoric acid (85–87%, H$_3$PO$_4$) (0.1 mole) were added. The addition resulted in a mild exotherm. Immediately following the phosphoric acid addition, the solution was heated to its reflux temperature (about 60° C.). The system was heated at reflux for approximately 3 hours. The reaction was then cooled to 5° C. and sufficient ammonium hydroxide added to raise the pH to 7–8. During the addition of ammonium hydroxide, the temperature was not allowed to exceed 30° C. The methylene dichloride layer was separated, dried over magnesium sulfate and stripped to yield O,O-dimethyl - N - acetyl phosphoroamidothionate. The aqueous phase was saturated with ammonium sulfate and extracted with two 100 ml. portions of methylene dichloride. Drying and stripping of the methylene dichloride portions afforded additional O,O - dialkyl - N-acetyl phosphoroamidothionate.

Quantitative analysis of the reaction mixture indicated 100% conversion of O,O-dimethyl phosphoroamidothionate to O,O-dimethyl-N-acetyl phosphoroamidothionate.

EXAMPLE 2

35 g. (0.25 mole) of O,O-dimethyl phosphoroamidothionate were added to 30.4 g. (0.3 mole) of acetic anhydride and the mixture stirred at room temperature. 0.8 g. (approximately 0.007 mole) of 85% H$_3$PO$_4$ was added and the reaction mixture stirred at about 25° C.

The reaction was followed quantitatively and the yield of O,O-dimethyl-N-acetyl phosphoroamidothionate determined and reported in terms of percent of theoretical yield possible. The results are reported in Table I.

TABLE I

| Reaction time (hours): | O,O-dimethyl-N-acetyl phosphoroamidothionate, percent |
|---|---|
| 0 | 0 |
| 1 | 71 |
| 2 | 80 |
| 3 | 85 |
| 6 | 95 |

EXAMPLE 3

35 g. (0.25 mole) of O,O-dimethyl phosphoroamidothionate were mixed with 3.4 g. (0.3 mole) acetic anhydride. Thereafter 35 g. (0.41 mole) of methylene dichloride were added. To the well stirred solution 0.8 g. (0.007 mole) of 85% H$_3$PO$_4$ was added. The reaction was stirred ¾ hour at approximately 25° C. and then heated to reflux (50–55° C.) for the remainder of the reaction. The conversion to the desired O,O-dimethyl-N-acetyl phosphoroamidothionate was measured and is reported in Table II.

TABLE II

| Reaction time (hours): | O,O-dimethyl-N-acetyl phosphoroamidothionate, percent |
|---|---|
| 0 | 0 |
| 1 | 57 |
| 2 | 82 |
| 3 | 93 |
| 4 | 98 |

EXAMPLE 4

30.4 g. (0.3 mole) of acetic anhydride were added to 35 g. (0.25 mole) of O,O-dimethyl phosphoroamidothionate. Thereafter 35 g. (0.41 mole) methylene dichloride were added. Then 1 g. of an Amberlyst-15 resin (Rohm & Haas) approximately 4 meq. of H+/g. of resin, 40 to 50 m.²/g. surface area, 200 to 600 A. average pore diameter) was added. The mixture was stirred for ¾ hour at room temperature then heated to reflux with stirring. The production of the desired O,O-dimethyl-N-acetyl phosphoroamidothionate was monitored and the results reported in Table III in terms of percent of theoretical amount possible.

TABLE III

| Reaction time (hours): | O,O-dimethyl-N-acetyl phosphoroamidothionate, percent |
|---|---|
| 0 | 0 |
| 1 | 36 |
| 2 | 78 |
| 3 | 94 |
| 4 | 99 |

EXAMPLE 5

35 g. (0.25 mole) of O,O-dimethyl phosphoroamidothionate in 35 g. (0.41 mole) methylenedichloride were mixed with 30.4 g. (0.3 mole) acetic anhydride. 0.8 g. (0.008 mole) of sulfuric acid was added and the mixture heated at reflux temperature. The reaction was stirred at reflux and sampled periodically for the desired product O,O-dimethyl-N-acetyl phosphoroamidothionate. The results are reported in Table IV.

TABLE IV

| Reaction time (hours): | O,O-dimethyl-N-acetyl phosphoroamidothionate, percent |
|---|---|
| 0 | 0 |
| ¼ | 98 |
| 1 | 97 |
| 5 | 95 |

EXAMPLE 6

35 g. (0.25 mole) of O,O-dimethyl phosphoroamidothionate and 35 g. (0.41 mole) methylene dichloride were mixed with 39 g. (0.3 mole) propionic anhydride. 1 g. of 85% phosphoric acid was added to the mixture. The mixture was heated to reflux temperature (69–70° C.). After approximately 4 hours the reaction was completed, i.e. approximately 100% conversion to O,O-dimethyl-N-propionyl phosphoroamidothionate.

EXAMPLE 7

10 ml. of acetic acid were slowly added to 20 ml. of ice cold acetic anhydride. The mixture was heated to approximately 50° C. for 15 minutes and then cooled to 0° C. The mixed anhydride of formic and acetic acid was thereby produced. 30 ml. of methylene dichloride (0.47 mole) and 21.2 g. (0.15 mole) of O,O-dimethyl phosphoroamidothionate were added rapidly. Then 0.5 ml. of 85% phosphoric acid was added. The mixture was stirred at room temperature and then heated to reflux. At the end of approximately 6 hours, the conversion to O,O - dimethyl - N - formyl phosphoramidothionate was 83% of theoretical possible. After 23 hours, approximately 95% of theoretical of the formyl derivative had been produced.

EXAMPLE 8

Methanesulfonic acid as a catalyst 75.6 g. of a crude O,O-dimethyl phosphoramidothionate-methylene dichloride mixture (35.2 g. or 0.25 mole of the phosphoroamidothionate) containing approximately 1% water were treated with 1 g. of acetic acid to neutralize any basic impurities present. 38.8 g. (0.375 mole) of acetic anhydride were thereafter added to the O,O-dimethyl phosphoroamidothionate mixture. 0.5 g. of a 70% methanesulfonic acid solution (0.35 g. or 0.0037 mole of active methanesulfonic acid) was then added. The reaction mixture was then heated to reflux and monitored by gas-liquid chromatography. The results are reported in Table V in terms of percent of theoretical amounts possible.

TABLE V

| Reaction time (minutes): | O,O-dimethyl-N-acetyl phosphoroamidothionate, percent |
|---|---|
| 0 | 0 |
| 10 | 38 |
| 15 | 79 |
| 20 | 88 |
| 30 | 94 |
| 60 | 100 |

Other reactions using methanesulfonic acid were conducted in a manner similar to that described, but using various amounts of methanesulfonic acid. These results showed that with higher molar ratios of methanesulfonic acid to O,O-dimethyl phosphoroamidothionate, the faster the reaction. However, as low as 0.0014 mole of methanesulfonic acid per mole of O,O-dimethyl phosphoroamidothionate could be used.

EXAMPLE 9

No catalyst 35.2 g. (0.25 mole) of O,O-dimethyl phosphoroamidothionate were mixed with 35.2 g. (0.42 mole) of methylene dichloride and 38.8 g. (0.375 mole) of acetic anhydride. The solution was heated to reflux temperature and sampled at selected intervals using gas-liquid chromatography for the amount of the N-acyl derivative produced. Very little of the desired N-acyl derivative was produced over a period of several hours.

By the general procedures described above, acetic anhydride acylations of O,O-dimethyl phosphoroamidothionate were conducted using nitric acid and perchloric acid separately as catalysts and, in each case, dichloroethane as solvent. The reactions were successful in producing O,O-dimethyl-N-acetyl phosphoroamidothionate.

The following examples show systems which are ineffective in the production of the N-acyl derivatives of O,O-dialkyl phosphoroamidothionate.

EXAMPLE 10

28 g. (0.2 mole) of O,O-dimethyl phosphoroamidothionate and 158 g. (2.7 mole) of acetone were mixed with 24 g. (0.2 mole) of s-collidine. Thereafter 30.6 g. (0.3 mole) of acetic anhydride were added through a dropping funnel over a 15-minute period. The reaction was stirred at room temperature for 20 minutes and then warmed to 40° C. Thereafter the reduction mixture was heated to its reflux temperature and stirred overnight. Analysis indicated no reaction occurred, i.e. no O,O-dimethyl-N-acetyl phosphoroamidothionate was produced.

EXAMPLE 11

138 g. mixture of O,O-dimethyl phosphoroamidothionate and methylene dichloride (50.7% phosphoroamidothionate—0.5 mole) were treated with 5 g. (0.08 mole) of acetic acid to neutralize any alkaline species present. At ambient temperatures, 76.5 g. (0.75 mole) of acetic anhydride were added in one portion. Then 2.5 g. (0.02 mole) of monoethyl acid phosphate were added. The mixture was heated at 60° C. for 3 hours and the reaction monitored by gas-liquid chromatography. Many reaction products were produced—however, very little of the O,O-dimethyl-N-acetyl phosphoroamidothionate was produced.

EXAMPLE 12

122 g. solution of O,O-dimethyl phosphoroamidothionate (46% phosphoroamidothionate—0.4 mole) and toluene were treated with 1 g. of acetic acid to neutralize any alkaline species present. 61.2 g. (0.6 mole) acetic anhydride were added and then 2 g. (0.018 mole) of a 50/50 mixture of monomethyl and dimethyl phosphoric acid were added. The solution was stirred at room temperature. No O,O-dimethyl-N-acetyl phosphoroamidothionate was present after 2 hours. The solution was then heated at reflux for 3 hours. Less than 10% of the desired O,O-dimethyl-N-acetyl phosphoroamidothionate was produced.

As will be evident to those skilled in the art, various modifications on this invention can be made or followed, in the light of the foregoing disclosure and discussion, without departing from the spirit or scope of the disclosure or from the scope of the following claims.

I claim:

1. Process for preparing N-acyl derivatives of O,O-dialkyl phosphoroamidothionate which comprises reacting an O,O-dialkyl phosphoroamidothionate of the formula

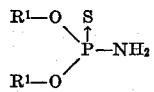

with an anhydride of the formula

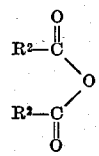

wherein $R^1$ is alkyl of 1 to 3 carbon atoms and $R^2$ is alkyl of 1 to 8 carbon atoms, in the presence of catalytic amounts of methanesulfonic acid at a temperature of 20–90° C.

2. Process of claim 1 wherein an inert solvent is present.

3. Process of claim 1 wherein the O,O-dialkyl phosphoroamidothionate is O,O-dimethyl phosphoroamidothionate.

4. Process of claim 1 wherein the anhydride is acetic anhydride.

5. Process of claim 1 wherein the acid is present in an amount from 0.001 to 10 moles of acid per mole of O,O-dialkyl phosphoroamidothionate.

6. Process for preparing O,O-dimethyl-N-acetyl phosphoroamidothionate which comprises reacting O,O-dimethyl phosphoroamidothionate with acetic anhydride in the presence of 0.001 to 2 moles of methanesulfonic acid per mole of phosphoroamidothionate, and 0.05 to 100 moles of an inert solvent per mole of phosphoroamidothionate at a temperature of 20 to 90° C. for a period of 0.25 to 24 hours.

7. Process of claim 6 wherein the solvent is methylene dichloride.

References Cited

Wagner & Zook: "Synthetic Organic Chemistry," 1953, John Wiley & Sons, Inc., p. 567.

JOSEPH P. BRUST, Primary Examiner

U.S. Cl. X.R.

260—403, 959